United States Patent [19]
Rosencranz

[11] 3,771,877
[45] Nov. 13, 1973

[54] DENSITOMETER INCORPORATING OPTICAL ATTENUATOR WITH DIRECT READOUT OF OPTICAL DENSITY

[75] Inventor: Robert Rosencranz, Highland Park, Ill.

[73] Assignee: Sargent-Welch Scientific Company, Cook County, Ill.

[22] Filed: Feb. 14, 1972

[21] Appl. No.: 225,837

[52] U.S. Cl............... 356/186, 356/201, 356/209, 356/225, 356/225, 356/227
[51] Int. Cl. ...... G01j 3/48, G01n 21/48, G01j 1/42
[58] Field of Search................... 356/210, 209, 212, 356/180, 186, 211, 202, 204, 227, 225, 88, 89, 40

[56] References Cited
UNITED STATES PATENTS

| | | | |
|---|---|---|---|
| 2,586,746 | 2/1952 | Tyler | 356/212 |
| 3,473,878 | 10/1969 | Schweitzer | 356/210 |
| 3,421,821 | 1/1969 | Alessi | 356/209 |
| 3,296,922 | 1/1967 | Goldberg | 356/40 |
| 2,073,223 | 3/1937 | Rose | 356/180 |
| 3,545,870 | 12/1970 | Burgarella | 356/227 |
| 3,449,050 | 6/1969 | Keahl | 356/89 |
| 3,488,122 | 1/1970 | Roussopoulos | 356/88 |

*Primary Examiner*—David Schonberg
*Assistant Examiner*—V. P. McGraw
*Attorney*—John L. Alex

[57] ABSTRACT

An instrument for determining optical density by measurement of diffuse reflected light. The instrument includes a light source, means for forming a beam of diffuse reflected light, an electrical balancing circuit, and an optical attenuator for controlling the intensity of light incident on a photoresponsive element forming a part of the balancing circuit. In the use of the instrument, the units of optical density are read directly from the optical attenuator, and mechanical movement thereof serves to provide an aperture of increased or decreased size, admitting more or less light, until electrical balance is achieved in the circuit. A balanced circuit condition is indicated by extinguishment of a single bulb, and the reading is taken only when the balanced condition occurs. In the preferred form of construction, the optical attenuator is in the form of a disc or wheel having a gradually increasing opening therein, and adapted for direct manipulation by the operator. Calibration of the instrument is achieved by illuminating a standard or known control specimen, and adjusting a nulling potentiometer in a balancing bridge to produce a balanced condition in the circuit. By using a mechanical attenuator instead of an electrical signal strength control, the unit is simplified in construction and is more accurate and reliable in use.

14 Claims, 5 Drawing Figures

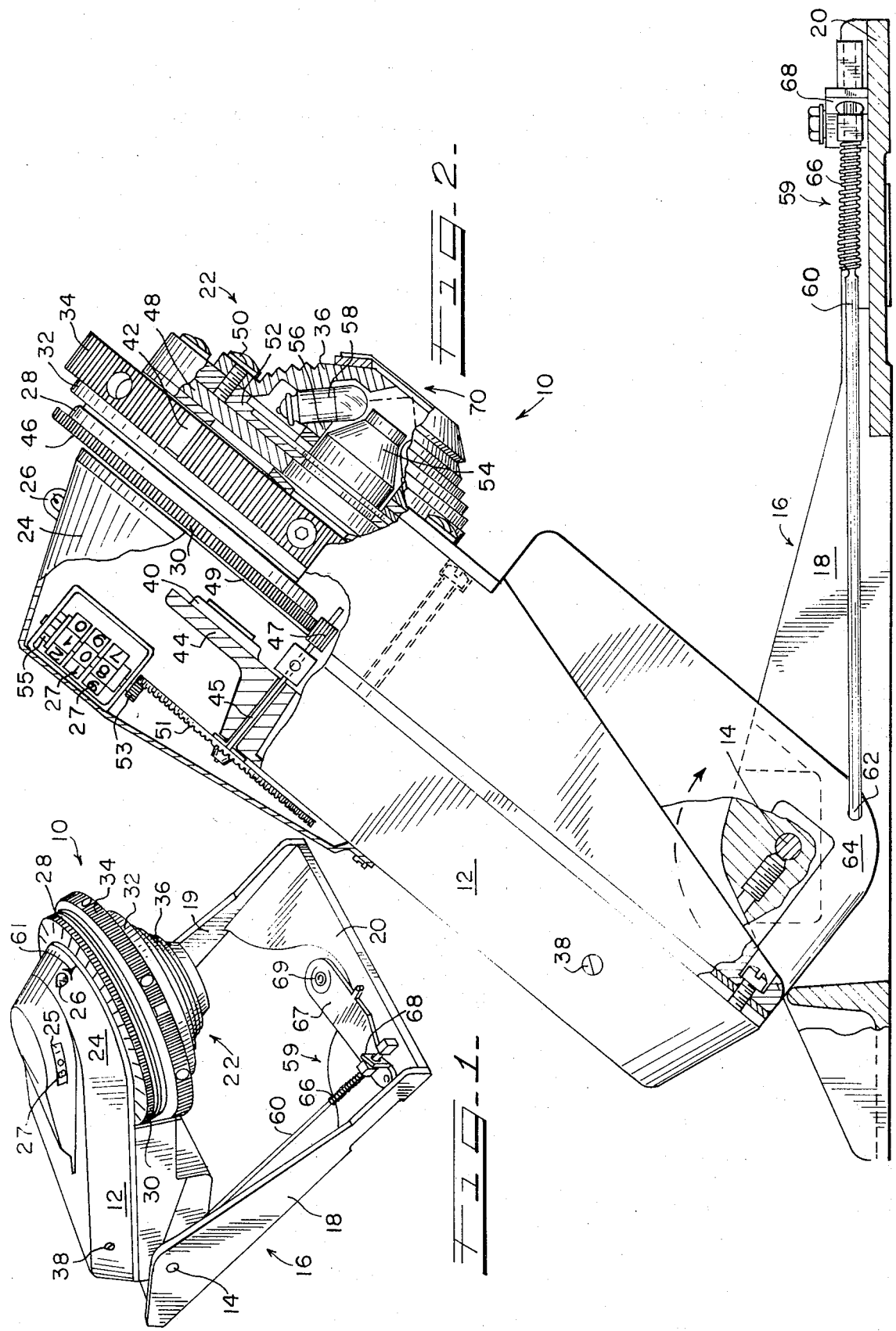

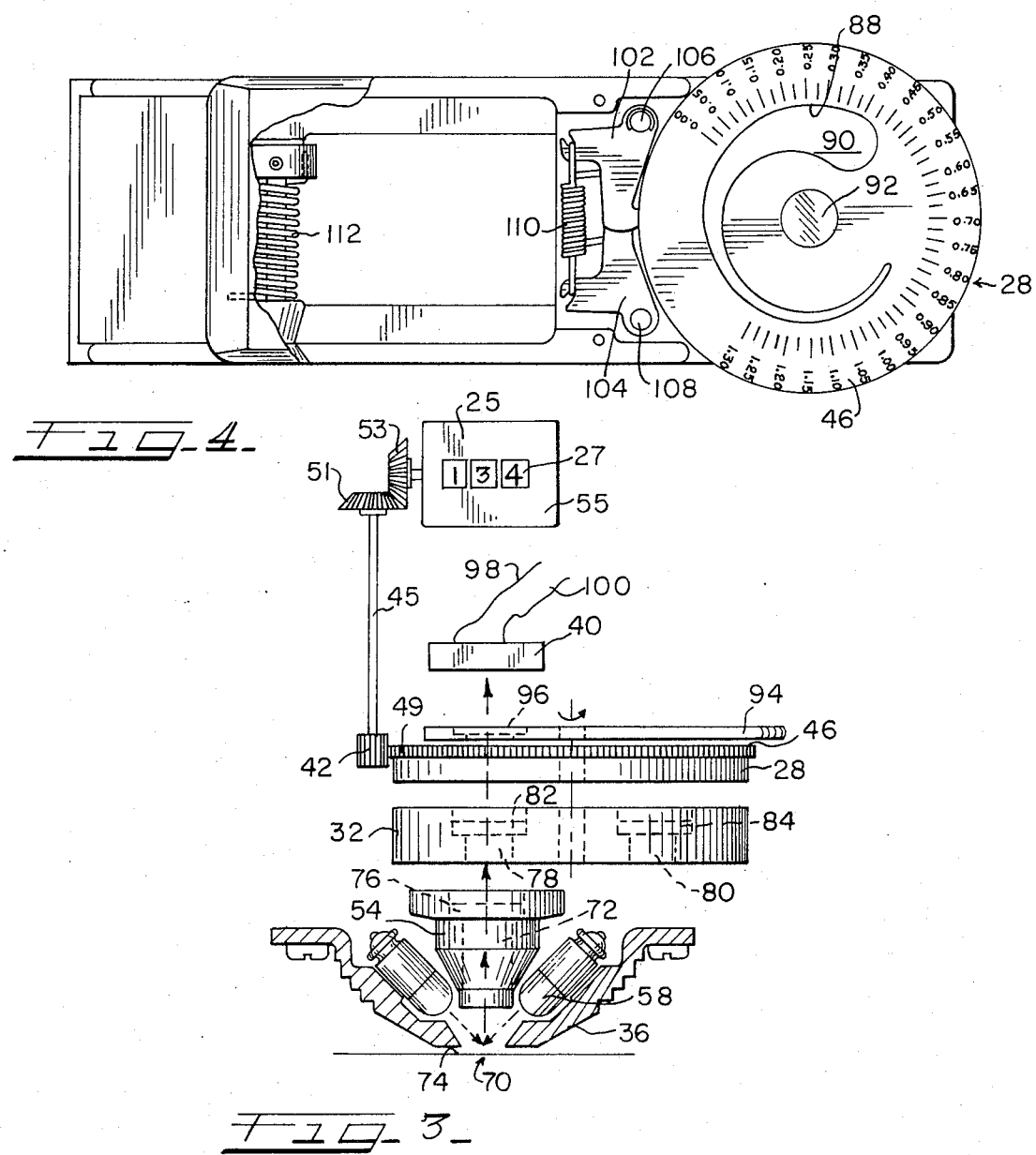

DENSITOMETER INCORPORATING OPTICAL ATTENUATOR WITH DIRECT READOUT OF OPTICAL DENSITY

BACKGROUND OF THE INVENTION

The present invention relates generally to optical densitometry, and more particularly to an improved reflectometer of the so-called null or null comparator type which is used in the measurement of diffuse reflection density. According to the invention, means are provided for mechanically increasing or attenuating the intensity of a reflected light signal which is received by the instrument before such light falls on a photoresponsive element. In this manner, the intensity of light falling on the photocell may be directly mechanically controlled, and the response of the photocell may be thus adjusted so that a separately excited electrical bridge circuit of which it forms a part may be reduced to a zero output state. This in turn causes a signal lamp to be extinguished and indicates that the received signal has a predetermined intensity.

In normal use, it is desired to determine the optical density of an unknown specimen, and accordingly, after the instrument has been properly calibrated by exposure to specimens of known characteristics, a mechanical attenuator unit is moved to a position such that the intensity of a signal received by a photosensor is equal to the intensity of the known specimen; at this point, the position of the attenuator indicates the optical density of the unknown sample or specimen. The instrument measures illumination which is diffusely reflected perpendicular to the surface of the viewed specimen.

In the past, optical reflection densitometers of the general type with which the invention is concerned have been operated in several modes. In one typical unit, the instrument was calibrated against a specimen of known optical characteristics, and, thereafter, unknown specimens were examined, with the density being displayed on a meter or the like. In such units, the input signal was received and its strength converted to electrical energy before being appropriately amplified for use to operate a deflection meter or the like. In another common type of unit, the instrument was first calibrated, and a specimen was thereafter examined, during which time the instrument controls were manipulated so as to cause a signal light or the like to be extinguished. In these instruments, it was common to change the sensitivity of the photocell by electrical or electronic means so that an output signal of an associated electrical bridge or the like would be reduced to zero or to a predetermined output. Since the bridge output signal was amplified and supplied to the signal light, a zero bridge output resulted in an extinguished light, and since such instruments operate on the basis of giving their characteristic reading when the bridge or balance circuit output is zero, they are referred to as null type or null reading instruments.

Although a number of commonly available instruments intended to measure optical density are considered to be generally satisfactory in use, there is still room for improvement in the accuracy, economy and other characteristics of such instruments. Thus, for example, prior art instruments of the type using display meters are disadvantageous where a large range of values is to be read, particularly where the units in question are logarithmically calibrated units, such as optical density. In other words, since readings differing by 10 units of optical density actually differ by 100 units of intensity, meters which are sufficiently sensitive to read or detect low values are susceptible to undue movement and perhaps even damage when exposed to specimens having high density values. Instruments which can be satisfactorily read throughout a wide range often include multiple dials or require range switching, which adds complexity and expense and commonly makes such instruments difficult to read or susceptible of being misread in use.

In those instruments of the null reading type wherein gain of the photocell is adjusted so that bridge output is reduced to zero, accurate results may be obtained in certain ranges of optical density without great difficulty. However, an inherent characteristic of photoresponsive elements such as photoresistive devices or the like is that their gain or response varies considerably from a linear intensity response, depending upon the strength of the received signal. In other words, if a predetermined change in voltage or resistance of 10 units, for example, is brought about in the photocell under a given change of illumination, change of an equal amount of illumination will not cause an equally responsive change in voltage or resistance where the absolute intensity of light received is greatly different from that earlier received.

Attempts to calibrate photoresponsive devices to eliminate this common characteristic non-linear response feature of photocells have been made with some success; however, even partially successful devices are expensive and somewhat unreliable, particularly if they include components which are heat sensitive or otherwise not inherently stable.

In view of the foregoing drawbacks and disadvantages of certain prior art densitometers, it is an object of the present invention to provide an improved reflection type densitometer.

Another object is to provide a densitometer wherein optical density may be read from a directly mechanically movable part of the unit.

A further object is to provide a reflection densitometer of the null type, that is, an instrument in which a given signal, such as the extinguishing of a light bulb or the like, indicates that a reading is to be taken.

Another object is to provide a null type reflection densitometer having a light aperture mounted for movement and including a logarithmic spiral type opening therein for desirably attenuating incident light to a predetermined degree for each unit of aperture movement.

A further object is to provide an instrument having a linear reading scale which is adapted to display easily read values directly indicating optical density.

A still further object is to provide a photosensitive instrument in which light is attenuated prior to falling on a photosensitive element forming a part of an electrical bridge unit, and wherein a signal is given when the output of the bridge is reduced to zero and when a reading may be taken.

Still another object is to provide a reflection densitometer in which reading specimens of varying optical density does not require making any electrical or electronic changes in previously calibrated electrical and electronic circuits.

Another object is to provide an instrument adapted to measure diffuse reflection density with improved accuracy and simplicity.

A still further object is to provide an improved null type reflection densitometer adapted to measure diffuse reflection density and which includes means for illuminating a specimen viewing area, means for forming a beam of light reflected perpendicularly from the specimen, an electrical balancing circuit having a photosensor therein for controlling the balance of the circuit in response to the intensity of the diffuse reflected light, a signal unit operative in response to a balanced condition of the circuit, mechanical control means in the path of the light beam for varying the intensity of the beam in order to balance the circuit by controlled illumination of the photosensor, and means associated with the control for indicating the optical density of the specimen when the signal unit indicates a balanced condition of the circuit.

These and other objects and advantages of the invention are carried into practice in a typical embodiment by providing a densitometer which includes an electrical balancing circuit, signaling means to indicate a balanced condition of the circuit, a photosensitive element in the circuit which brings about a balanced or unbalanced condition of the circuit in response to the intensity of light received by the sensor, and a mechanical control for varying the intensity of the received light to bring about a balanced condition within the circuit, with the control unit including an optical density scale which may be read directly when the signal means indicates that the circuit is in a balanced condition.

The manner in which these objects and advantages are carried into practice will become more clearly apparent when reference is made to the following detailed description of the preferred embodiments of the invention set forth by way of example and shown in the accompanying drawings, wherein like reference numbers indicate corresponding parts throughout.

BRIEF DESCRIPTION OF THE DRAWINGS

FIG. 1 is a perspective view of one form of reflection densitometer made according to the invention and shown with the reflection head portion in a raised position;

FIG. 2 is an enlarged side elevational view, with portions broken away and partly in section, showing certain details of construction of the densitometer instrument;

FIG. 3 is a vertical sectional view which is partly diagrammatic and which shows means for illuminating the subject of specimen and the path taken by the beam of diffuse reflected light toward the photoresponsive element;

FIG. 4 is a horizontal view, partly in plan and partly in cross-section, showing the mechanical attenuator used to control the intensity of the beam of diffuse reflected light incident upon the photocell.

DESCRIPTION OF THE PREFERRED EMBODIMENTS OF THE INVENTION

Figure 5:
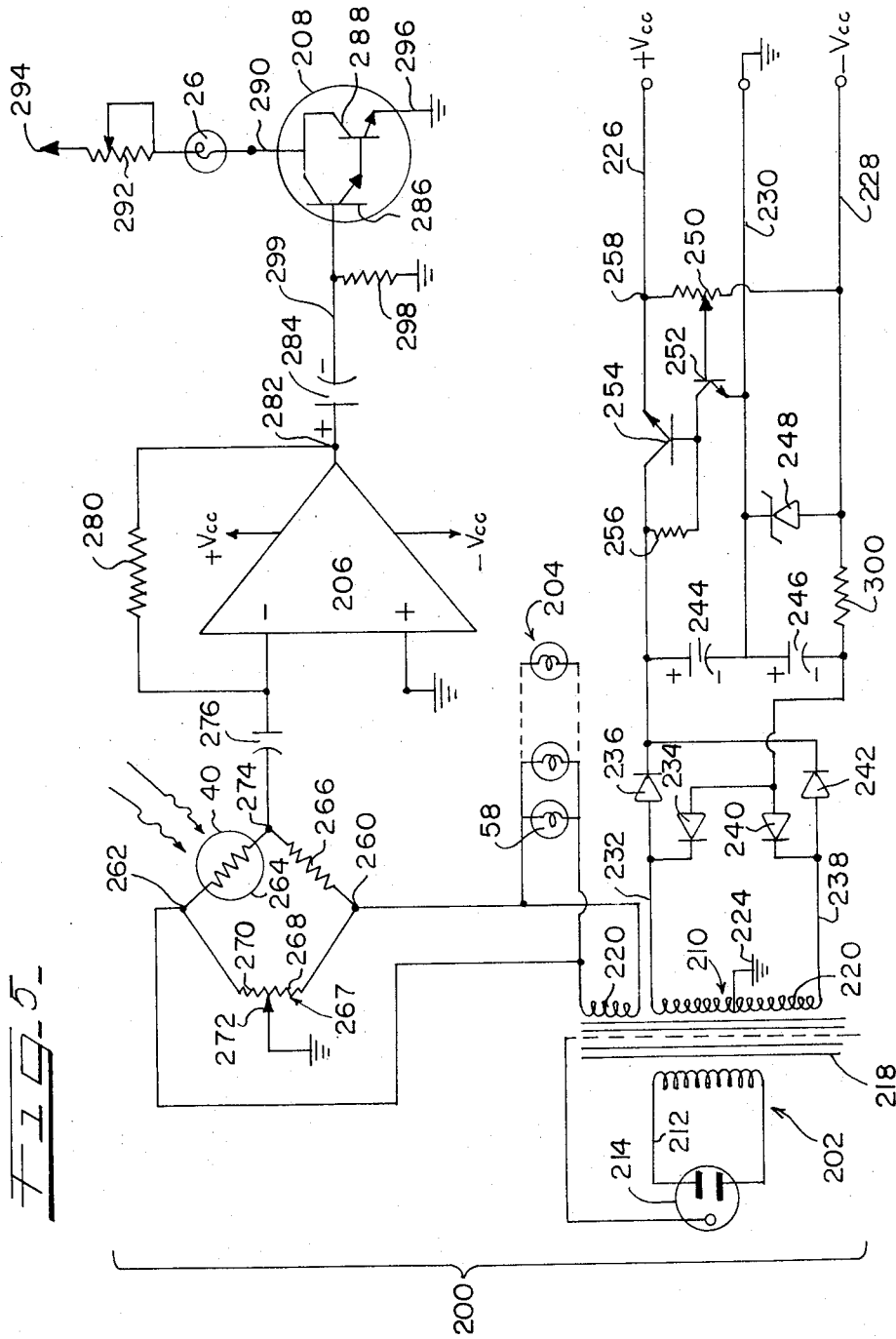
FIG. 5 is a schematic view of one preferred form of circuitry which is useful in carrying out the invention.

Although it will be understood that the principles of the invention may be embodied in a number of different forms of instruments, a detailed description of the invention will be made by reference to an embodiment wherein the optical attenuator is in the form of an apertured wheel mounted for rotary movement and disposed within the instrument between the beam guide and the photosensor, and wherein units of optical density may be directly read by viewing a digital indicator behind a window within the instrument. The attenuator aperture is in scroll-like form with a logarithmic increase in aperture for each unit of rotary movement.

Referring now to the drawings in greater detail, FIG. 1 shows a densitometer made in accordance with the invention to be generally designated 10 and to include a body portion 12 mounted for pivotal movement about the axis of a shaft 14 and secured to a frame unit 16 which includes a pair of leg portions 18 and a transverse web 20. A reflection head assembly 22 is shown to include an upper housing portion 24 for an electrical balance circuit, a null signal bulb 26, an apertured light attenuator wheel 28 having a serrated edge portion 30, a rotatable filter wheel 32 also having serrated edge 34, and an outer light shield 36. A calibration screw 38, to which reference will be made later, is positioned in the body 12 so that access thereto may be had from the exterior of the unit 10. The upper housing portion 24 also includes a window 25 having a plurality of indicators for display of a plurality of numerals 27 therein which, as will be pointed out, are used to indicate the optical density being read.

Referring now to FIG. 2, additional details of construction of the unit are shown, and it may be seen that a photosensor element 40 is mounted on bracket 44 inside the housing 24. Disposed below the sensor 40 in vertically descending relation are, respectively, the apertured attenuator wheel 28 having a top surface portion 46, the filter wheel 32 with a textured outer edge portion 34 having spaced apart detents 42 therein and a frame element 48 having fasteners 50 therein supporting an apertured plate 52. Disposed below these elements are an inner light shield 54, and the outer light shield 36, as well as means in the form of a collar 56 for supporting a plurality of illuminating bulbs 58. Also secured to the bracket 44 is a vertically extending shaft 45 having a spur gear 47 on the lower end thereof for engaging the toothed outer surface 49 of the attenuator wheel 28. The upper end of the shaft 45 includes a beveled ring gear 51 having teeth thereon adapted to engage a beveled gear 53 driving a display mechanism 55 of which the individual numerals 27 form a part. Accordingly, the numerals 27 are moved each time the wheel 28 is moved, and a different reading is present through the window 25 each time the wheel 28 is moved.

A lowering, sighting and locking mechanism for the head 22 is generally designated 59 and includes a rod 60 having an end portion 62 thereof received in the lower portion 64 of the body 12, a spring unit 66 and a locking clamp 68. This permits the reflection head assembly 22 to be lowered into a reading position parallel to and closely spaced apart from the transverse base 20 of the stand 16 when the clamp 68 is manipulated. Upon lowering the head 22, the alignment guide 67, which contains a sighting or alignment lens 69, retracts to a withdrawn position. This unit 67 is used to provide precise alignment between the sample whose optical density is to be observed and the center opening 70 of the beam-forming elements of the head 20; further details of this unit are disclosed in U.S. Pat. No. 3,473,878, issued Oct. 21, 1969.

Referring now in particular to FIG. 3, it will be noted that a plurality of bulbs 58 are disposed about the opening 70 in the outer light shield 36, with six equally spaced bulbs 58 being preferred. It will also be noted that the means for forming a vertical beam of light are also provided in the form of a cylindrical bore 72 in the inner light shield 54. Although reference will be made to this point elsewhere herein, it should be noted that the path of the light rays toward the surface 74 whose optical density is to be measured are generally inclined at about a 45° angle with respect to the surface 74, and that a substantial portion of the light which has such an incident angle will consequently be reflected at an equal reflection angle and will not enter the cylindrical bore 72. However, as shown by the vertically extending arrows in FIG. 3, a certain amount of diffuse reflection will be created, and it is the intensity of this reflection which is to be measured by the instrument. Therefore, the reference to this light as constituting a beam of light is intended to imply only that light passing in this direction.

Disposed at the top of the inner light shield 54 is a fixedly mounted infrared filter 76. Above the filter 76 is the movable filter wheel 32 containing a plurality of openings 78, 80, etc. in which are disposed optical filters 82, 84 for example. Since it is shown that the wheel 32 is mounted for rotation, it will also be understood that selected filters 82, 84 may be positioned within the path of diffuse reflected light which is propagated coaxially with the bore 72. Also mounted for rotation and disposed above the filter wheel 32 is the apertured wheel 28, which includes a continuous inwardly directed side wall portion 88 (FIG. 4) defining a scroll-like continuous opening 90 of enlarged radial extent at one end and greatly diminished radial extent at the other end, with the center of the opening 99 lying a fixed radial distance from the center portion 92 of the optical attenuator wheel 28.

Disposed above and also co-axially with the wheel 28 is a so-called multiplier lever assembly 94 having an aperture 96 therein also co-axially aligned in one position of the lever, with the bore 72, the filter wheel opening 78 and a portion of the attenuator opening 90. In the alternative, the fixed aperture 96 in the lever 94 may be replaced with a neutral density filter, whereby an additional change of a predetermined amount of optical density, 1.0 unit, for example, may be introduced.

Above all of the elements just described is the photosensor unit 40 having a pair of leads 98, 100 extending therefrom and adapted to be connected with the remaining portions of an electrical circuit to be described in detail elsewhere herein.

Referring now to FIG. 4, it will be noted that the top surface 46 of the wheel 30 contains a plurality of numerical indicia for visual observation by an operator of the instrument. It is apparent that rotation of the wheel 28 will serve to move larger or smaller portions of the opening 90 into registry with the various apertures aligned therewith, and that the amount of this movement may be judged by aligning the numbers on the top surface 46 of the wheel 28 with a fixed pointer 61 (FIG. 1) on the head portion 24 of the instrument 10, for example. FIG. 4 also shows a brake or like element 102 for engaging the detents 42 in the filter wheel 32 and a similar element 104 for engaging the smooth outer surface portion 29 of the wheel 28. The elements 102, 104 are mounted on pivots 106, 108 and urged into position by a spring 110. In this manner, the settings of the instrument are unlikely to be moved unintentionally. Pivotal movement of the body 12 to permit specimens to be inserted and removed is controlled by a counter balancing spring 112. In the form shown, optical density is displayed on the upper surface 46 of the wheel 28 opposite the pointer 61, as well as in the window 27; it is apparent that either or both of these display systems might be used.

Referring now to FIG. 5, one form of electrical circuit which is useful with the invention is the balancing circuit 200, which has a number of principal elements, including a power supply 202, a specimen illuminating circuit 204, a resistance bridge 264 which includes the variable resistance photosensor 40 as an integral part thereof, an operational or other amplifier 206, and an output or signal control amplifier circuit 208. In particular, the power supply 202 includes a step down transformer 210 having leads 212 connected in use to an alternating current source 214, a primary winding 216, a core 218, and a first, low voltage secondary 220 which is center tapped and grounded as at 224. A higher voltage secondary 222 forms part of the circuit which is typically adapted to provide 13 volts positive polarity D.C. at output line 226 and 13 volts negative polarity D.C. at output line 228, with the center line 230 being grounded. For this purpose, line 232 feeds a pair of oppositely arranged diodes 234, 236, while line 238 feeds similarly arranged diodes 240, 242, with the resulting bridge producing a pulsating direct current which may be filtered or stabilized by one or more capacitors 244, 246 and, if desired, by other circuitry of a known type provided for this purpose.

The power supply system 202 also includes a reference or regulating diode 248 extending between the negative voltage output line 228 and the ground potential line 230, while negative voltage is also supplied through one terminal of a potentiometer 250 to the base of a control transistor 252, the emitter-collector circuit of which extends between the ground line 230 and the base of a second transistor 254. A resistor 256 is placed in the circuit between the positive output line 226 and the base of the transistor 254, while the other terminal 258 of the potentiometer 250 is also attached to the line 226.

Referring now to the lower voltage secondary winding 220, this winding preferably supplies 2.5 volt alternating current to a plurality of the lamps 58, six of such lamps being provided in a preferred embodiment.

Moreover, the 2.5 volt alternating current is also supplied to opposite input terminals 260, 262 of a Wheatstone bridge 264 which, in the preferred form of circuit, includes a single fixed resistor 266, and a potentiometer 267 having resistances 268, 270. Moving the grounded contact 272 along the potentiometer changes the ratio of the resistances 268, 270 to each other. In the bridge 264, the fourth resistor is a variable resistor in the form of the photosensor 40, the resistance of which varies in response to the intensity of lifht which is incident thereon. The fourth or output terminal of the Wheatstone bridge is the terminal 274. As will be readily understood, a balanced condition of the circuit occurs when the resistors are properly balanced in a known manner; for this reason, adjustment to predetermined values of the two resistors 268, 270 will predetermine the value at which resistor 40 will create a balanced circuit condition; this feature of the invention is desired for proper instrument calibration and is referred to elsewhere herein.

It will be appreciated that, in the use of the circuit, with all of the resistors 266–270 and variable photosensor 40 in appropriate electrical balance, no detectable signal will appear across terminals 272, 274. If the resistance of the variable resistor 40 is changed from a balanced condition, however, such a signal will occur, and will be supplied through capacitor 276 to the input terminals of the operational amplifier 206, which receives 13 volts positive and negative D.C. at the points indicated from the power supply 202. The high resistance of the feedback resistor 280 causes the amplifier 206 desirably to exhibit very high gain. The output of the amplifier 206 appearing at terminal 282 passes through capacitor 284 and is fed to the output amplifier 208, which is shown to include transistors 286, 288 arranged as a so-called Darlington pair, with the collectors having a common junction 290 which is in turn attached to one terminal of the null indicating lamp 26. The other terminal of the lamp 26 is connected through a potentiometer 292 to a 13 volt D.C. source, as at 294, while the Darlington pair is grounded as at 296. The potentiometer 292 adjusts the sensitivity of the lamp, and is an adjustment normally made only once, at the factory when the instrument is manufactured. A resistor 298 grounds the output line 299.

Referring now to the operation of the instrument 10, it will be assumed that the instrument is to be calibrated and that one or more specimens are thereafter to have the optical density thereof determined. Initially, the instrument is in the position of FIG. 1, a specimen of known standard optical density is placed on the web 20, with the alignment guide 67 falling over the center of the standardized specimen. Thereupon, the head portion 22 of the instrument 10 is lowered about the pivot axis 14, causing the alignment guide 67 to retract and positioning the head 22 of the instrument 10 such that the opening 70 in the outer light shield 36 is parallel to and closely spaced apart from the surface 74 of the specimen. In this position, light reflected diffusely from the bulbs 58 passes through the cylindrical bore 72, through the infrared filter 76, through an appropriate color or other optical filter 82, and thence through the opening 90 in the attenuator wheel 28. Thereafter, the beam passes through the aperture 96 in the optical lever 94 and impinges on the photosensor 40 with an intensity determined by the diffuse reflective characteristics of the standard.

A mark on the upper surface 46 of the wheel 28 which indicates the optical density of the standard or control specimen is pre-aligned with a pointer or fixed position on the head 22; thus, the indicator is pre-set to read the density of the specimen. In the event that the instrument is properly calibrated, the position of the wheel 28 is such that the light in the beam is attenuated just sufficiently to balance exactly the resistance 40 in the bridge unit 264, and accordingly, the bridge has no output at terminal 274, the Darlington pair amplifier 208 is biased into a non-conducting state, and the signal bulb 26 does not light. However, with the indicator set to read the known optical density of the standard, if the signal bulb 26 is illuminated, the calibration screw 38 must be manipulated, causing the relative resistance of resistors 268, 270 to change. These resistors may then be balanced by screw manipulation so that no output appears at terminal 274, this condition being indicated when the light is extinguished.

Thereafter, the instrument having been calibrated, the specimen is removed and an unknown specimen is placed on the web 20 with the portion to be observed aligned with the center of the guide 67. If the density of this specimen differs from that of the standard, the light 26 will be illuminated, and the attenuator wheel 28 is moved in a direction and to the extent necessary to extinguish the bulb. When the bulb is extinguished, the optical density of the unknown specimen may be read from the wheel 28 directly opposite the same pointer or index with which the standard number was aligned when the instrument was calibrated.

Referring now briefly to certain other advantages and features of the invention, it will be noted that the illustrated embodiment is one wherein the optical attenuator is in the form of a rotatable wheel 28. This construction is advantageous insofar as it is simple and reliable, and provides for easy direct reading. However, it will also be understood that other optical attenuators, including those arranged for linear rather than rotary motion, might be used. Moreover, other forms of known diaphragms which provide an ability to attenuate or stop down a light opening or aperture might also be provided for this purpose, if desired.

While other electrical circuits of various types might be able to be used with the invention, the preferred form of electrical circuit is the illustrated form which utilizes the simple Wheatstone bridge, the two adjustable or calibrating resistors, and the photoresponsive resistor. Typically, the principal components and values of the illustrated electrical circuitry may be as follows: The operational amplifier may be a commercially available type 1439 C integrated amplifier, using an 8.2 megohm feedback resistor 280, and coupled by a 0.1 microfarad capacitor 276 to the bridge 264. The total resistance of both resistors 268, 270 is commonly 1,000 ohms, and the fixed resistor 266 is preferably a 100 ohm resistor. A suitable Darlington pair for use as the amplifier 208 may be a 2N 5306 integrated transistor unit, using a grounded resistor 298 of 1,000 ohms and coupled to the output 282 of the amplifier 206 by a 5 microfarad capacitor 284. In the power supply circuit the diodes shown are suitably selected so as to give the output voltages, values indicated, capacitors 244, 246 are 250 microfarads, the resistor 300 is an 82 ohm resistor, and the Zener diode 248 has a 13 volt threshold. Potentiometer 250 is a 25,000 ohm adjustable resistor, the resistor 256 is 3.3 ohms and both of the transistors 252, 254 are of the 2N 2713 type.

While the form of circuit shown in by no means the only type adaptable for use with the present invention, it will be observed that this circuit is greatly simplified in respect to prior art circuits wherein attenuation of the signal, or of a signal generated thereby was carried out by electronic means. As pointed out above, attenuating a signal received from a photoemissive phototube or the like is quite difficult without using expensive compensating circuits, since the relation between the intensity of received illumination and phototube output is linear only within a relatively narrow range. Moreover, many electronic controls are too sensitive to temperature variations for reliable use in uncontrolled industrial or like environments, where densitometers of the present type are commonly found to be used. It may also be noted that the provision of infrared filters and other optical filters, either for color or for other purposes is simply made by reason of the configuration of the filter wheel portion of the instrument, and that this affords greater versatility and permits easy allowance to be made for analyzing colored specimens.

Elsewhere herein, reference is made to the fact that photoresistive elements and the like ordinarily exhibit a quite non-linear relation between the intensity of incident light and electrical output in their response to incident light. However, this characteristic of photoresistor elements is entirely overcome by the arrangement of the present invention, since the mechanically operable attenuator wheel attenuates light such that exactly the same degree of light always falls upon the photocell when the instrument is to be read, rather than varying degrees of light. Thus, the characteristics of the specimens are read from the position of the attenuator wheel rather than from a unit indicating the resistance of the photocell 40. Accordingly, simplicity and accuracy of the instrument are greatly improved.

In use, the densitometer of the invention is extremely simple and reliable, calibration being accomplished simply by placing a standard adjacent the aperture and manipulating a screw. The optical attenuator, being merely a metal or like disc, may be made under highly precise conditions and the quality thereof may be carefully controlled. The logarithmic forms of the spiral not only permits indicia to be placed on the periphery of the wheel 28 in linearly spaced apart relation, but also enables interpolation between marks to be made without the necessity of taking into account the logarithmic character of the optical density scale. The means for forming the beam of diffuse reflected light has been shown to include the inner light shield 54 having a cylindrical bore therein, a plurality of aligned apertures, and a pair of collimating lenses; however, other collimating means might be used for this purpose if desired. The optical lever 94, while not a necessary feature, provides additional flexibility in the use of the instrument. Optical range multiplication can also be achieved by placing a neutral density filter in one of the filter-receiving portions of the filter wheel.

It will thus be seen that the present invention provides a new and improved reflection densitometer unit having a number of advantages and characteristics, including those specifically pointed out herein and others which are inherent in the invention. A typical embodiment of the invention having been described by way of example, it is contemplated that variations of this form of unit may occur to those skilled in the art, and that such forms may be made without departing from the spirit of the invention or from the scope of the appended claims.

I claim:

1. A reflection densitometer for measuring the optical density of a specimen, said densitometer comprising, in combination:
   a light source directed on said specimen;
   means for receiving a light beam diffusely reflected from said specimen along a path extending away from said specimen;
   an electrical balancing circuit including a photoresponsive element lying in the path of said light beam for controlling the balance of said circuit according to the intensity of said beam, and further including an output indicator for indicating a balanced condition in said circuit;
   optical attenuating means disposed in said path of said light beam for varying the intensity of said beam impinging on said photoresponsive element;
   indicating means mechanically coupled to said optical attenuating means for indicating optical density; and
   calibration means for establishing the balance point of said electrical balancing circuit such that when said attentating means is adjusted to balance said circuit said indicating means indicates the optical density of said specimen.

2. A densitometer unit as defined in claim 1 wherein said photoresponsive element comprises a photoresistor having a resistance which varies in response to the intensity of light received thereby.

3. A densitometer unit as defined in claim 1 in which said balancing circuit includes a Wheatstone bridge having three resistors of predetermined resistance and in which said photoresponsive means forms a fourth resistor, said bridge being supplied at two terminals thereof by an energy source, and adapted to have a signal occur at one of the terminals thereof except when the resistance of said photosensor has a predetermined value.

4. A densitometer unit as defined in claim 1 in which said balancing circuit is in the form of a bridge having a fixed resistor, a pair of adjustable resistors, and a variable resistor, whereby said adjustable resistors may be adjusted so as to produce a substantially zero bridge output only under conditions when said variable resistor is sufficiently illuminated to produce a predetermined resistance.

5. A densitometer unit as defined in claim 1 which further includes means for illuminating a specimen disposed adjacent the beam forming means and having means for directing such illumination to the surface of said specimen at substantially a 45° angle.

6. A densitometer unit as defined in claim 1 which further includes means for removably interposing plural selected optical filters within the path of said beam between said specimen and said photoresponsive means.

7. A densitometer unit as defined in claim 1 which further includes means for interposing at least one additional aperture between said specimen and said photo-responsive means, whereby additional control of light attenuation may be provided.

8. A densitometer unit as defined in claim 1 wherein the elements thereof are incorporated into an instrument having an optical head portion, mounted for movement toward and away from a specimen, the optical density of which is to be determined, and which includes means for positioning said head in a predetermined position in relation to said specimen.

9. A densitometer unit as defined in claim 1 wherein said means for indicating the optical density of said specimen comprises a digital display unit mechanically coupled to said mechanical control means.

10. A densitometer unit as defined in claim 1 in which said optical attenuator is in the form of a rotatable wheel having a continuous, scroll-like opening thereof extending generally parallel to the periphery of the wheel throughout a significant portion of its extent and having the center of said opening spaced a substantially constant distance from the center of said wheel.

11. A densitometer unit as defined in claim 1 wherein said opening in said attenuator increases logarithmically for each unit of rotation of said attenuator, whereby units indicating equally spaced gradients of optical density may be spaced equally about the periphery of said attenuator, and whereby interpolation between units thereof may be accurately carried out on a linear basis.

12. A densitometer instrument as defined in claim 1 in which said optical attenuator is in the form of a rotatable wheel having a continuous, scroll-like opening thereof extending generally parallel to the periphery of the wheel throughout a significant portion of its extent and having the center of said opening spaced a substantially constant distance from the center of said wheel.

13. A densitometer unit as defined in claim 1 wherein said means for indicating the optical density of said specimen comprises a digital display unit mechanically coupled to said mechanical control means.

14. A reflection densitometer for measuring the optical density of a specimen, said densitometer comprising, in combination:

an instrument housing;

means defining an opening in said housing, said opening being adapted to be placed adjacent said specimen for receiving light reflected diffusely therefrom;

means in said housing for receiving a plurality of light sources arranged about the periphery of said opening;

means for directing the light from said light sources at said specimen surface at a substantial angle from the vertical;

means for receiving the light diffusely reflected from said specimen along a path extending generally perpendicularly from said specimen;

an electrical balancing circuit including a photo-responsive element lying in the path of said diffusely reflected light for controlling the balance of said circuit according to the intensity of said light, and further including an output indicator for indicating a balanced condition in said circuit;

optical attenuating means disposed in the path of said diffusely reflected light for varying the intensity of said light impinging on said photo-responsive element;

indicating means coupled to said optical attenuating means for indicating optical density; and calibration means for establishing the balance point of said electrical balancing circuit such that when said attenuating means is adjusted to balance said circuit said indicating means indicates the optical density of said specimen.

* * * * *